May 30, 1944.　　　C. A. LOUCKS ET AL　　　2,350,173
BEET LIFTING AND TOPPING IMPLEMENT
Filed April 16, 1943　　　5 Sheets-Sheet 1

INVENTORS
C.A.Loucks
L.K.Schmidt
ATTORNEYS

May 30, 1944. C. A. LOUCKS ET AL 2,350,173
BEET LIFTING AND TOPPING IMPLEMENT
Filed April 16, 1943 5 Sheets-Sheet 2
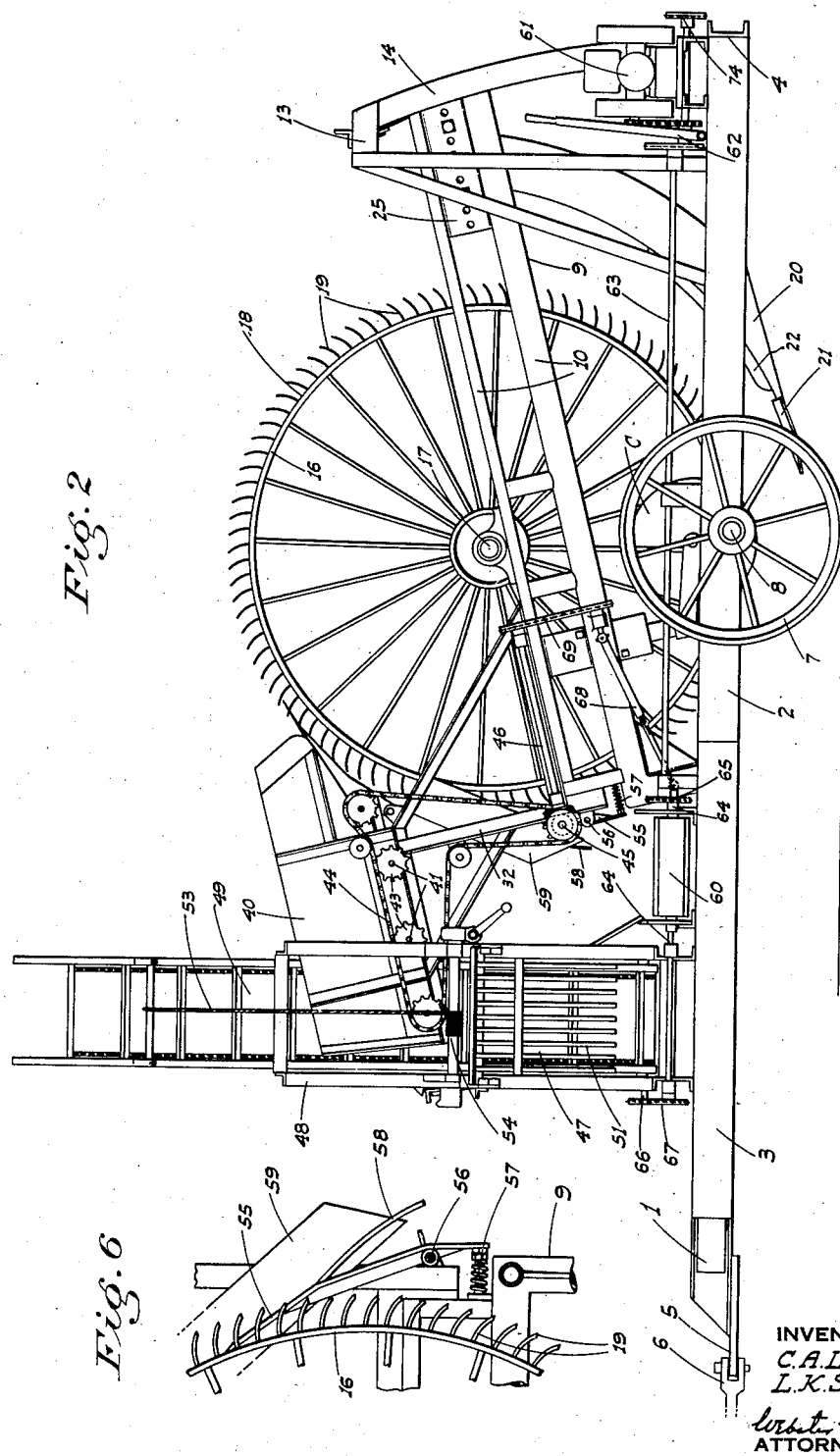
INVENTORS
C.A.Loucks
L.K.Schmidt
ATTORNEYS

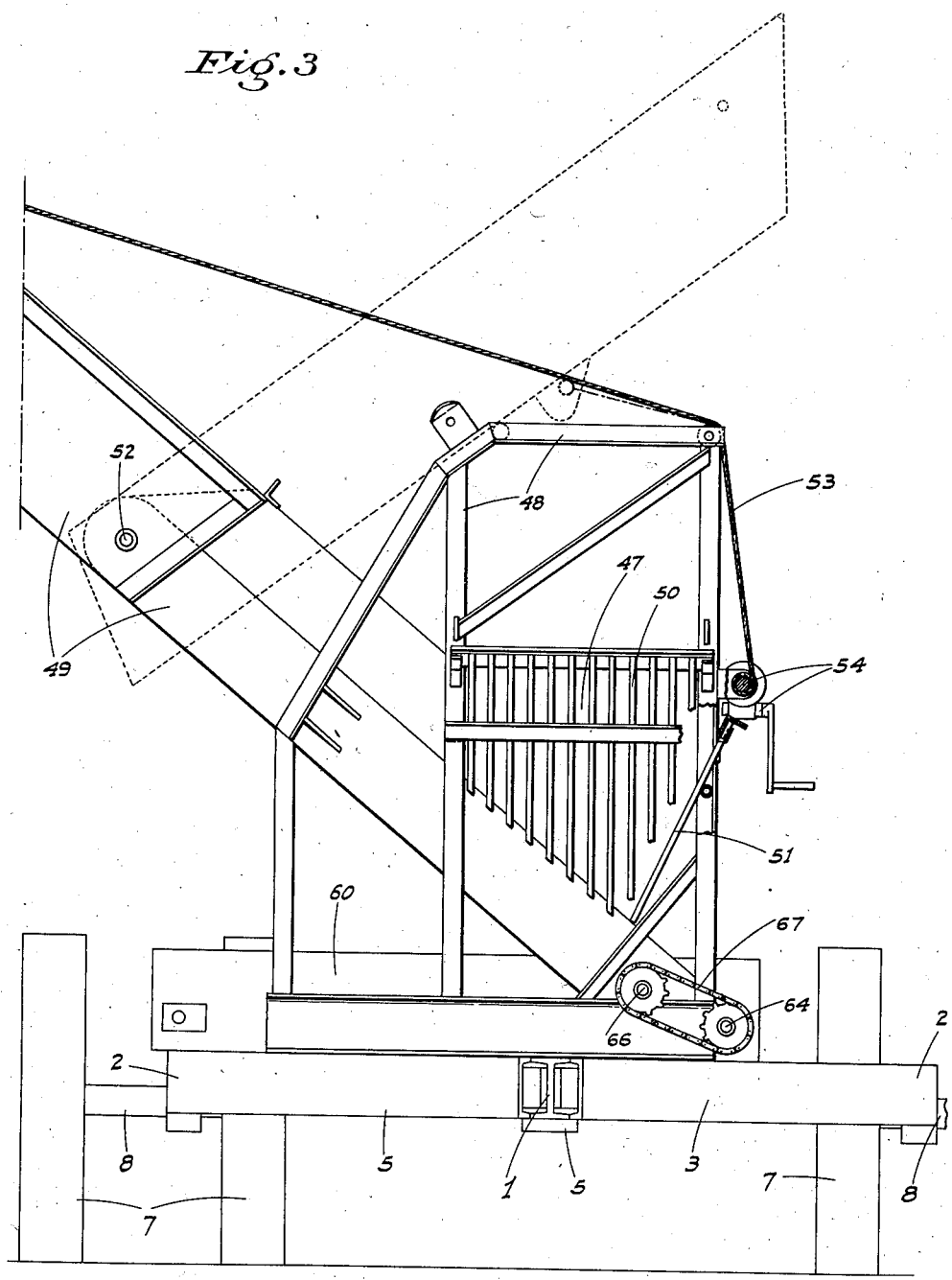

May 30, 1944.  C. A. LOUCKS ET AL  2,350,173
BEET LIFTING AND TOPPING IMPLEMENT
Filed April 16, 1943  5 Sheets-Sheet 4
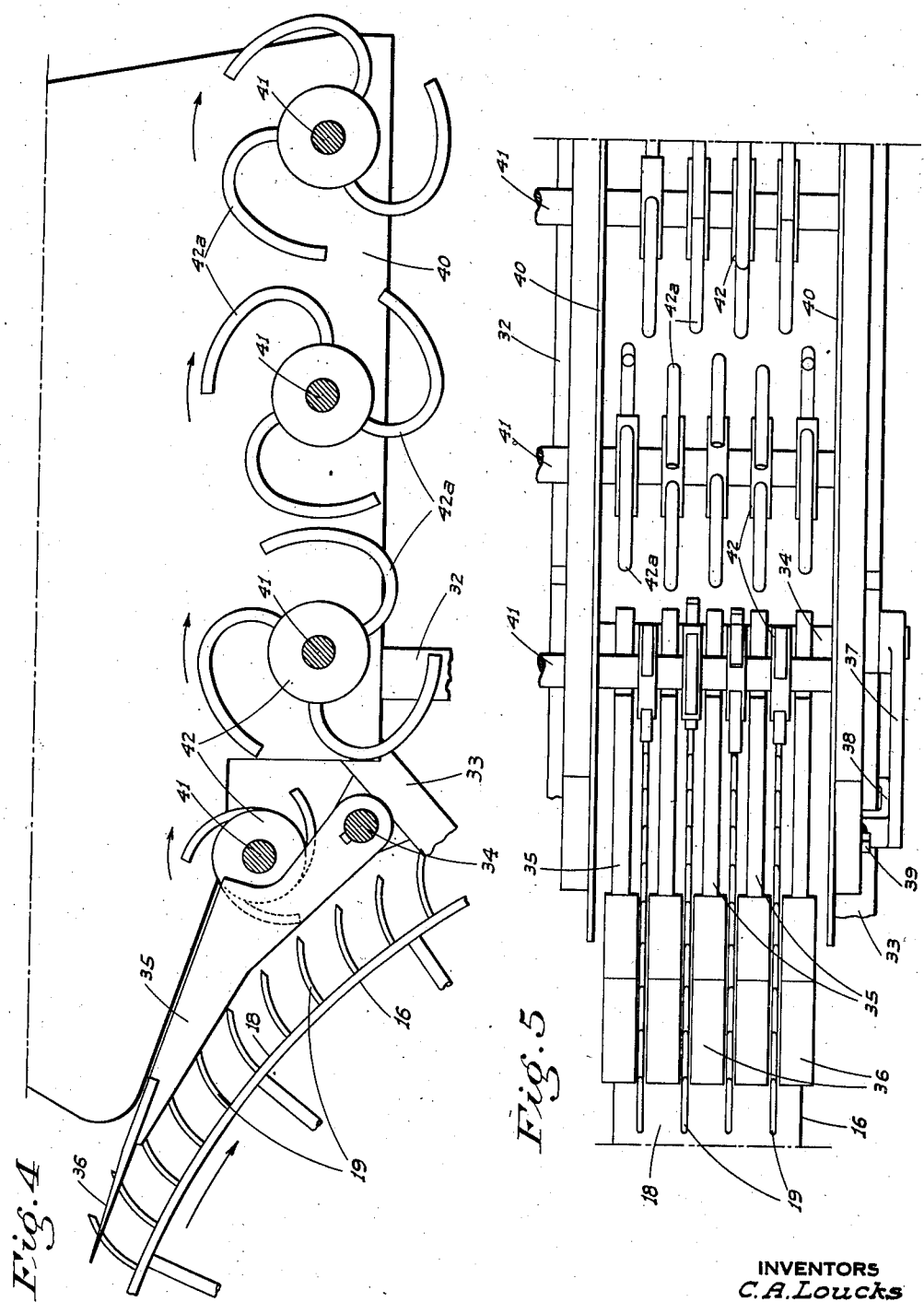
INVENTORS
C. A. Loucks
L. K. Schmidt
BY
ATTORNEYS May 30, 1944.　　C. A. LOUCKS ET AL　　2,350,173
BEET LIFTING AND TOPPING IMPLEMENT
Filed April 16, 1943　　5 Sheets-Sheet 5
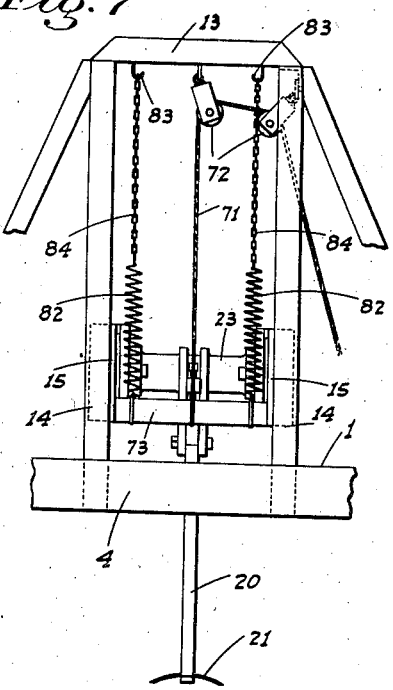
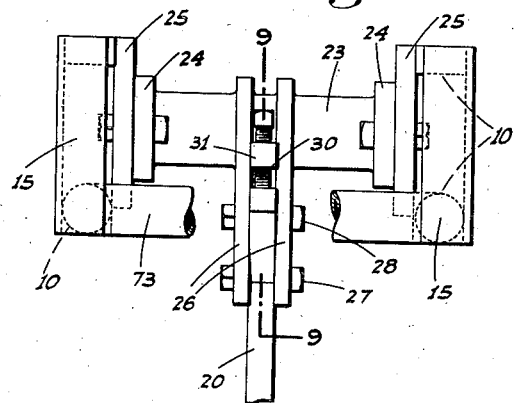
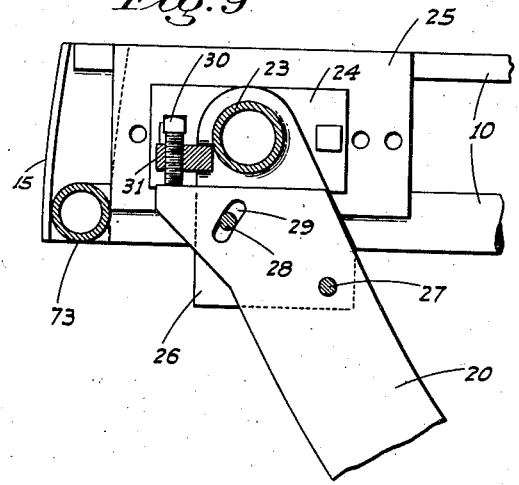
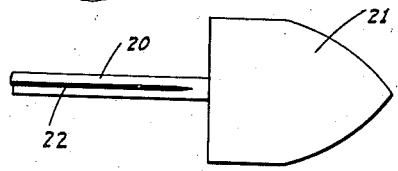
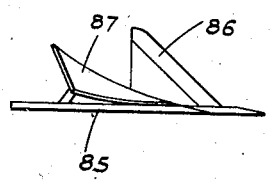
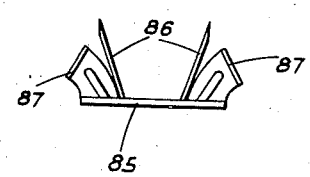
INVENTORS
C.A.Loucks
L.K.Schmidt
BY
ATTORNEYS Patented May 30, 1944

2,350,173

UNITED STATES PATENT OFFICE 2,350,173

BEET LIFTING AND TOPPING IMPLEMENT

Claude A. Loucks, Walnut Grove, and Lloyd K. Schmidt, Rio Vista, Calif., assignors of twenty-one and one-fourth per cent to said Loucks, thirty-six and one-fourth per cent to said Schmidt, twenty-one and one-fourth per cent to Albert M. Jongeneel, Walnut Grove, and twenty-one and one-fourth per cent to George P. du Bose, Stockton, Calif.

Application April 16, 1943, Serial No. 483,256

15 Claims. (Cl. 55—108)

This invention relates generally to a beet harvesting implement, and in particular the invention is directed to, and it is an object to provide, a unique beet lifting and topping implement.

The present application is a continuation-in-part of our co-pending application, Serial No. 461,402, filed October 9, 1942, now Patent No. 2,336,623, granted Dec. 14, 1943.

A further object of the invention is to provide a beet lifting and topping implement which includes, in novel combination, a tractor-drawn main frame supported on opposite sides by ground engaging wheels, a sub-frame disposed between said ground engaging wheels and floatably or swingably pivoted in connection with and surrounded by the main frame, the pivotal mounting for the sub-frame being disposed adjacent the forward end of the latter whereby said sub-frame trails relative thereto, and a ground engaging wheel journaled in said sub-frame intermediate its ends; said wheel having circumferential rows of spaced spikes projecting from the wheel face for impaling and lifting beets over which they pass; the implement including a beet topping unit associated with the wheel clear of the ground but in position to top beets impaled on and lifted by said spikes.

An additional object of the invention is to provide a beet lifting and topping implement, as in the preceding paragraph, which includes a plow mounted in rigid, unitary connection and floatable vertically with said swinging sub-frame, the plow being disposed in transversely centered relation below the wheel and being mounted for both vertical and longitudinal adjustment for the reason that the position of the plow relative to the ground engaging portion of the wheel face is quite critical. The plow, when in proper position of adjustmet, is normally set to a depth slightly below the beets in a row and at a predetermined longitudinal point slightly rearwardly of the vertical center line of the spiked wheel. The plow, with advance of the implement, functions to create enough suction to hold the spiked wheel down with sufficient force to assure that the spikes fully penetrate the beets as the wheel passes over the latter and before any loosening of the ground about the beets by the plow; the plow immediately thereafter acting to disrupt or loosen the earth about the impaled beets and before any substantial lifting movement thereof by the spikes, so that the beets may be readily lifted from the ground as the spikes begin to rise with continued forward movement of the wheel. The above is an important feature of the present invention.

It is also an object of the invention to provide a beet lifting implement which includes a spiked ground engaging wheel wherein the spikes project outwardly from the face of said wheel with a curve opposite to the direction of rotation, such curve being on a progression so that the spikes enter the beets with a smooth non-tearing action, whereby the beet flesh closely embraces about the spikes when the latter are fully penetrated so as to avoid loose play between impaled beets and the spikes and prevent accidental escape of beets prior to the latter reaching the beet topping unit.

A still further object of the invention is to provide an improved beet lifting and topping implement, which includes, in combination with a wheel-supported, tractor-drawn main frame, a vertically swingable sub-frame mounted in the main frame, a ground-engaging spiked wheel, a beet topping unit, and a separate beet-top stripping unit mounted on said sub-frame and disposed in cooperating relation to the wheel spikes; said beet topping unit and said beet-top stripping unit being of novel construction and disposed to discharge into separate carry-off conveyors mounted on and supported by the main frame.

An additional object of this invention is to provide a beet lifting and topping implement including, in the combination recited in the preceding paragraph, a unique power actuated beet tumbling conveyor, together with a novel grate-sided beet receiving hopper disposed between the beet topping unit and the corresponding carry-off conveyor; said beet tumbling conveyor and grate-sided hopper being arranged and operative to assure a maximum separation of earth and trash from the beets prior to delivery of the latter to said corresponding carry-off conveyor, and which conveyor projects upwardly and laterally whereby to discharge into the body of a truck running along the implement. In the present embodiment of the invention said laterally projecting beet carry-off conveyor is hinged intermediate its ends, whereby when the implement is not in use and is being transported from place to place, the upper half portion of said conveyor may be folded back onto the implement frame to reduce the extent of projection.

These objects we accomplish by means of such structure and relative arrangement of parts as will fully appear by a perusal of the following specification and claims.

In the drawings similar characters of reference indicate corresponding parts in the several views:

Figure 2 is a side elevation of the implement, looking at the side opposite that shown in Fig. 1, and with the beet engaging wheel raised.

Figure 3 is a fragmentary front end view of the implement, showing particularly the folding conveyor and the removable grates of the hopper at the lower end thereof.

Figure 4 is an enlarged fragmentary sectional elevation showing the beet topping knives and tumbling conveyor arrangement.

Figure 5 is a top plan view of the same.

Figure 6 is a fragmentary sectional elevation showing the mounting and arrangement of the top-stripping unit.

Figure 7 is a fragmentary rear end view of the implement, showing the mounting of the swinging sub-frame on which the plow and beet engaging wheel are mounted.

Figure 8 is a fragmentary enlarged rear end view of the swinging sub-frame detached and showing the mounting of the plow beam.

Figure 9 is a fragmentary sectional elevation on line 9—9 of Fig. 8.

Figure 10 is a fragmentary top plan view showing one form of the plow.

Figure 11 is a side elevation of a modified form of plow.

Figure 12 is a rear end view of the same.

Figure 1:
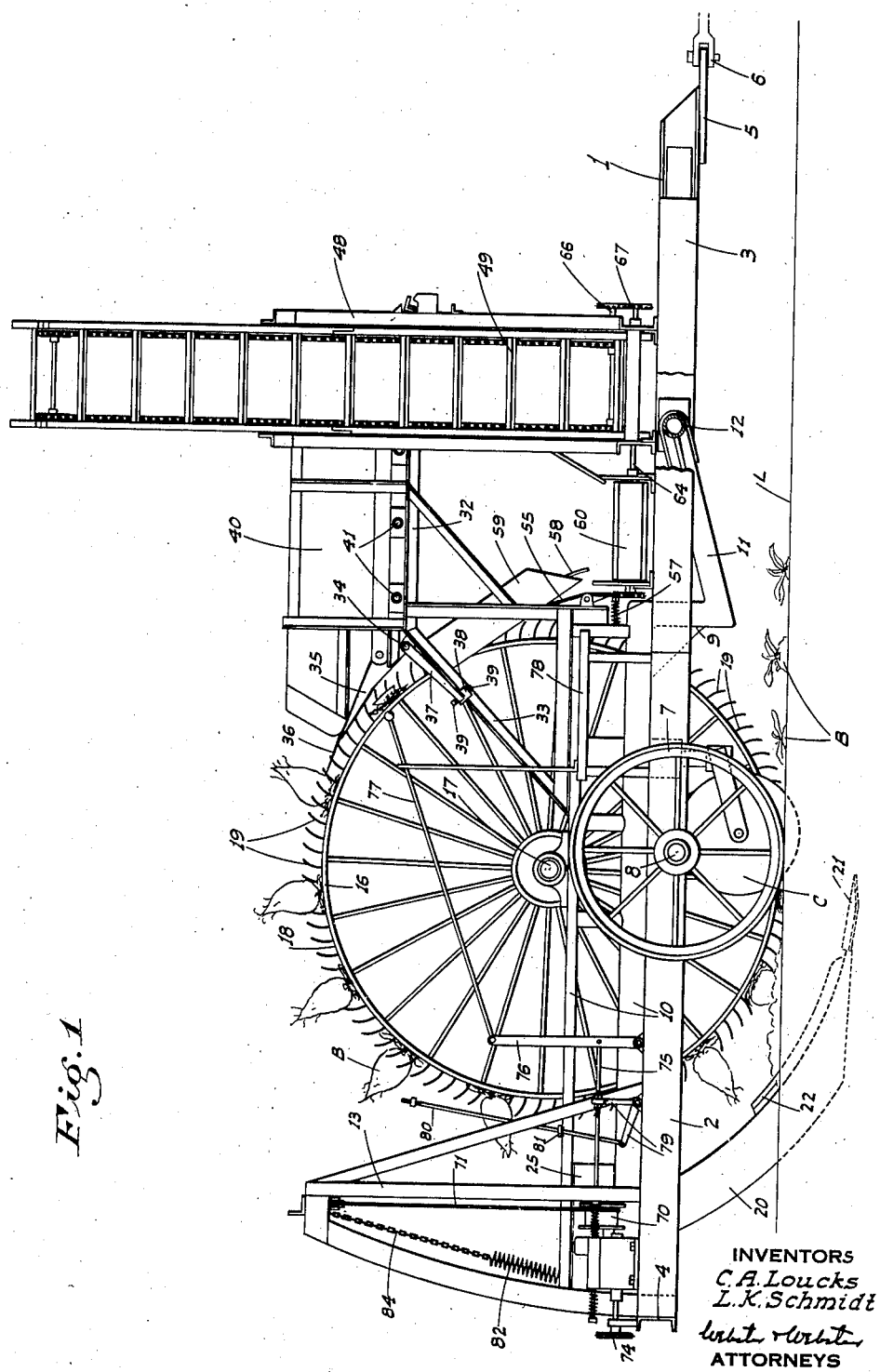
Figure 1 is a side elevation of the implement as in operation.

Referring now more particularly to the characters of reference on the drawings, the implement comprises an open, horizontally disposed main frame 1 which includes side beams 2, converging forwardly as at 3, and a rear cross beam 4. The frame 1 at its forward end is formed with a central forwardly projecting draft tongue 5 adapted for connection with a tractor drawbar 6. The main frame 1 intermediate its ends is supported on each side by a pair of wheels 7 journaled on an axle 8; each pair of wheels 7 being disposed and spaced to straddle laterally disposed rows of beets when the implement frame 2 is centered over an intermediate row.

An elongated sub-frame 9 is disposed centrally between the side beams 2 of the main frame and includes, in rigid unitary relation, transversely spaced side beam assemblies 10. Adjacent its forward end the sub-frame 9 is formed with a downwardly offset portion 11 and at its forward end said sub-frame is pivotally mounted for vertical swinging movement on and relative to the main frame by means of a cross shaft 12. In order to stabilize the sub-frame 9 against lateral deflection, it rides at its rear end in an upstanding guide frame 13 which includes arcuate guide beams formed of inwardly facing angle irons 14; the sub-frame at said rear end including arcuate guide shoes 15 which matchingly ride in said beams.

A relatively large diameter wheel 16 is mounted on a cross shaft 17 extending between and supported in connection with the side beam assemblies of the sub-frame 9. The wheel includes a flat, relatively wide face 18 on which is mounted a plurality of transversely spaced circumferentially extending rows of outwardly projecting spikes 19; the spikes of each row being disposed in adjacent but equi-distantly spaced relation. Each of the spikes is curved opposite to the direction of rotation of the wheel, said curve being on a progression so that the spikes will enter beets on an arc and in non-tearing relation thereto with advance of the implement and resulting rotation of the wheel.

A depending and forwardly curved plow standard 20 is mounted at its upper end in connection with the sub-frame rearwardly of the wheel 16, and centrally relative to the face of the latter, by an adjustable mount, as hereinafter described; the forward or lower end of said standard being fitted with a sub-soil plow 21 which is preferably shovel-like in plan (see Fig. 10) and concavo-convex transversely, with the convex surface uppermost. The plow 21 is of a width substantially equal to the width of wheel face 18, and is normally set to a depth which will be slightly below the lower end of beets in a row to be harvested. Longitudinally of the implement the plow is disposed closely adjacent but slightly rearwardly of the vertical center line of the spiked wheel 16. The upper surface of plow 21, lengthwise thereof, is disposed at a slight forward and downward incline relative to ground level L. The standard 20 at its forward edge and from a point adjacent the plow 21 to a point above ground level L is formed with a forwardly facing weed cutting blade 22.

As shown in Figs. 8 and 9, the mount for the standard 20 comprises a horizontal transverse shaft 23 non-turnably fitted at its ends with attachment plates 24 which abut in facing relation against side plates 25 fixedly secured on corresponding side beam assemblies 10 of the sub-frame 9; the attachment plates 24 being adjustable lengthwise of the implement, as shown. Intermediate the attachment plates 24 the shaft 23 is fitted with fixed depending guide plates 26 between which the upper end of the standard 20 engages with a close fit; the standard being pivotally mounted between guide plates 26 by a cross pin 27. Another cross pin 28 spaced from pin 27 rides in a slot 29 concentric with pin 27 to permit of adjustment of the standard 20 about cross pin 27 as an axis. Such adjustment is controlled by means of an adjustment screw 30 threaded through a cross block 31 fixed between the guide plates 26 adjacent shaft 23, said adjustment screw resting against the upper edge of standard 20 rearwardly of cross pin 28. As the attachment plates 24 are adjustable lengthwise of the implement, and as the standard 20 can be adjusted about cross pin 27 as an axis, the sub-soil plow 21 can be adjusted in its position relative to the ground engaging portion of the face 18 of the spiked wheel, both vertically and longitudinally of the implement. As will hereinafter appear, the position of plow 21 relative to the point at which face 18 rides the ground and the spikes penetrate the beets, is critical.

A beet topping unit is mounted in cooperation with the spiked wheel adjacent the top thereof and comprises the following:

A vertical frame 32 upstands from the sub-frame 9 adjacent its forward end and mainly ahead of the spiked wheel; said frame 32 including rearwardly and downwardly extending diagonal braces 33 on opposite sides of the spiked wheel. A transverse shaft 34 is rotatably mounted between the upper end portions of braces 33 adjacent but outwardly of the spiked wheel, and a plurality of rigid fingers 35 are fixed on shaft 34 in such spaced relation that the ends of said fingers, which project generally tangent to the spiked wheel, are disposed between the rows of spikes, as clearly shown in Fig. 5. At their forward ends the fingers 35 are each fitted with a topping knife 36, which knives likewise project between the rows of spikes in a circumferential plane a predetermined distance inwardly of the outer ends of said spikes.

At one end the shaft 34 is fitted with a radial lever 37 which extends generally lengthwise relative to and adjacent one of the braces 33, and at its outer end said lever is formed with a U-shaped member 38 which straddles one flange of said brace. Adjustment screws 39 are threaded through said member from opposite sides and engage said flange, whereby the lever can be adjusted to increase or decrease the distance between the cutting edge of knives 36 and the face 18 of the spiked wheel 16, and which determines the length of the top to be cut from the beets.

The frame 32 from and ahead of the fingers 35 supports a generally horizontal beet tumbling conveyor which comprises, between spaced side walls 40, a plurality of horizontal transverse shafts 41 disposed in spaced relation lengthwise of the implement and each carrying a plurality of relatively closely spaced spider wheels 42; the fingers 42a of said wheels curving rearwardly relative to the direction of rotation. The wheels on each shaft are staggered relative to the wheels on the adjacent shafts, and near points in the periphery of wheels on adjacent shafts are in relatively close transverse planes; the wheels on the shaft adjacent the fingers 35 being of reduced diameter and running partly between said fingers, as shown.

Exteriorly of one of the walls 40 the shafts 41 are fitted with sprockets 43 which are simultaneously driven by an endless chain assembly 44 which includes a drive sprocket 45 driven from a countershaft 46. This countershaft derives its power as hereinafter described.

The tumbling conveyor discharges at its forward end into a hopper 47 formed within an upstanding skeleton frame, indicated generally at 48, and mounted on the main frame. The bottom of this hopper comprises the lower end portion of an upwardly inclined laterally extending endless conveyor 49 which is mounted in supported relation on and extends outwardly from the frame 48. The side of the hopper opposite the tumbling conveyor and the lower end of the hopper are formed as removable grates, indicated at 50 and 51 respectively, these grates being removably mounted in any suitable manner. The endless conveyor 49 normally extends upwardly and outwardly relative to the implement a distance sufficient to discharge into a truck running alongside the implement. However, said conveyor 49 is hinged intermediate its ends as at 52, and arranged so that the upper end portion of the conveyor may be folded inwardly to rest at an incline against the frame 48, as shown in dotted lines in Fig. 3 whereby to permit of transport of the implement from place to place without interference by said conveyor. A cable 53 and a hand actuated windlass 54 serve to swing the upper end portion of the conveyor 49 from its normal outwardly projecting position to folded position.

Below the beet topping unit which includes the fingers 35 and knives 36, the implement includes a beet top stripping unit which comprises a plurality of chisel-like stripping bars 55 which extend between the rows of spikes to a point in engagement with the face 18 of the wheel 16; said stripping bars being parallel and diverging from the wheel at an outward and downward slope. The stripping bars 55 adjacent but short of their lower ends are pivotally mounted on a cross shaft 56 which is journaled in the upstanding frame 32. An adjustable compression spring 57 is engaged between the lower end of each bar and an adjacent portion of the frame, said springs acting to separately urge the stripping bars in a direction to frictionally engage the upper chisel-like ends thereof with the face 18 of the wheel 16. A curved deflector rod 58 is secured on each stripping bar 55 some distance above the shaft 56 and extends at a forward and downward slope therefrom to a termination in a vertical plane some distance ahead of shaft 56. The top stripping unit is confined within a chute formed by side plates 59. Below the lower end of rods 58 and side plates 59 another endless conveyor 60 is mounted; this conveyor being disposed horizontally and extending transversely of the implement, terminating at its outer end laterally of the implement so as to discharge onto the ground between beet rows.

Countershaft 46, conveyor 49, and conveyor 60 are constantly driven, when the implement is in operation, by means of drive mechanism which includes a small gasoline engine 61 mounted on the main frame at the rear thereof and adjacent one side thereof (see Fig. 2). The engine, through the medium of a hand actuated clutch unit 62, drives a horizontal shaft 63 journaled in connection with the adjacent side beam 2 of the main frame. At its forward end the shaft 63 drives a shaft 64 of the conveyor 60 by means of a short endless chain 65, and which shaft 64 in turn drives the lower shaft 66 of conveyor 49 by means of another short endless chain 67. A splined and universal drive shaft 68 connects the rear end of shaft 64 and an endless chain unit 69 mounted on the sub-frame and which drives the countershaft 46. By use of the splined universal drive-shaft 68 the sub-frame can rise and fall relative to the main frame without interference with the drive of countershaft 46 and endless chain 44, which actuates the tumbling conveyor.

As it is necessary to raise the sub-frame and the spiked wheel when the implement is being moved from place to place, or when making turns at the end of rows, a small power winch 70 is mounted on the main frame on the side opposite the engine 61 and alongside the upstanding guide frame 13 (see Fig. 1); a cable 71 from said winch extending upwardly over sheaves 72 and thence downwardly to connection with a tubular cross brace 73 at the rear end of the sub-frame 9, as shown in Fig. 7. The winch 70 derives its power from an endless chain drive 74 which extends across the back of the implement and is driven from the engine 61. The winch is controlled by a push-pull rod 75 which extends forwardly to pivotal connection with an upstanding pivotally mounted arm 76 whose movement is controlled by a rod 77 which extends forwardly and upwardly to a termination adjacent an operator's platform 78 mounted on the main frame alongside the top stripping unit. By manipulating the rod 77 in one direction or the other the workmen can control the winch 70. In order to assure that the winch 70 be automatically shut off, after predetermined raising movement of the sub-frame and spiked wheel, the push-pull rod 75 is actuated in a winch shut-off direction by means of a lever assembly indicated generally at 79, which includes a headed rod 80 slidably extending through an eye 8 on the sub-frame. When the head of rod 80 engages the eye 81 it actuates the assembly 79, pulling the rod 75 in a direction to shut off the winch.

Operation

In operation, the implement is attached to a tractor in draft relation and the winch 70 actuated to lower the spiked wheel into ground engagement and to slack the cable 71, whereby to permit the spiked wheel, together with the sub-frame to float or swing relative to the main frame with movement of the implement over the ground. The tractor is driven so that the spiked wheel 16 rides atop a row of beets B, and the plow 21 is adjusted to engage in the ground slightly below said beets and at a point slightly rearwardly of the vertical center line of the spiked wheel. The position or setting of the plow 21 is such that with advance of the implement said plow firstly functions to create sufficient suction to cause the spiked wheel to closely follow ground contour and the spikes 19 to fully penetrate the beets over which the wheel passes; this before any loosening of the ground around the beets by the plow. A moment after the beets are fully impaled on the spikes, which occurs when the spikes are on approximately the center line of the wheel axis, the plow 21 disturbs the earth around the impaled beets and exerts a lifting action thereon so that the beets are readily lifted from the ground by the spikes as the same begin to rise with continued forward movement of the wheel. Full penetration of the spikes into the beets is advantageous as it properly gauges the beets on the wheel for the subsequent topping thereof, and the penetration of the spikes into the beets is accomplished without a tearing action, for the reason, as previously described, that the spikes are on a progression curve.

After the beets are lifted from the disturbed ground by the spiked wheel, said beets are carried about on the wheel until they are inverted and reach the cutting knives 36. Thereupon, with continued rotation of the wheel, the beets are topped by said blades; the beets falling onto the tumbling conveyor and being carried therealong in a horizontal and forward direction. This tumbling conveyor rolls and bounces the beets, causing a separation therefrom of substantially all earth and trash, which falls through the spider wheels 42 onto the carry-off conveyor 60. From the tumbling conveyor the beets fall into the hopper 47 and thence are carried upward and laterally by the conveyor 49, which, as previously indicated, discharges at its upper end into a truck traveling alongside.

The beet tops or crowns remain on the spikes until they reach the stripping unit, whereupon the stripping bars 58 strip said tops from the spikes, and the free tops slide down the deflector rods 58 and fall onto the carry-off conveyor 60.

The above described implement functions to accomplish a ready and effective lifting and topping of beets, a subsequent clean separation of the topped beets from the tops, weeds and initially adherent earth, and delivery of said beets to a truck moving alongside the implement.

One of the essential features of the present invention, and which is important to successful operation of the implement, is the combination of the swingably mounted or floating sub-frame on which the spiked wheel is journaled, and the sub-soil plow mounted on said frame and positioned as described. With this combination the spiked wheel is free to float vertically, whereby to follow ground contour, and which flotation is directly responsive to the plow 21, assuring full penetration of the spikes into the beets, regardless of vertical rising and falling of the main frame due to ground undulation laterally of the beet row being harvested.

If desired, tension type counterbalancing springs 82 may be connected in transversely spaced relation between the cross brace 73 at the rear end of the floating frame and the upper end of the upstanding guide frame 13; said springs preferably being adjustably connected with hooks 83 on said frame by means of link chains 84.

While the implement as herein described is of single-row type, it may be constructed for multi-row use by employing a plurality of spiked wheels mounted in axially spaced relation and preferably upon independent sub-frames.

In Figs. 11 and 12 is disclosed a modified form of plow which comprises, with a plow member 85, a pair of upwardly diverging longitudinally extending ground cutting blades 86 spaced apart a sufficient distance to slice through the ground on opposite sides of the beets in the row, and rearwardly and outwardly curving deflectors 87 arranged to cause a lateral deflection of earth from the outside of the cuts made by the ground cutting blades 86 so as to further loosen the ground and relieve the beets therefrom. This form of plow is mounted and positioned the same as plow 21.

If desired, coulters C suitably mounted in connection with the sub-frame may be disposed to ride into opposite sides of the beet row at the bottom of the spiked wheel whereby to cut away a portion of the beet leaves, weeds, etc.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A beet lifting implement including a trailing frame vertically swingable, when in operative position, about an axis adjacent its forward end and adapted for movement along the ground, a spiked ground engaging wheel journaled in a fixed position on said frame, means cooperating with said spiked wheel to remove beets from the spikes above the ground and to discharge said beets from the implement, and a sub-soil plow mounted in rigid connection with said frame, the plow and wheel remaining in the same relative positions upon swinging of the frame and the plow being positioned below the spiked wheel at a predetermined point vertically below and slightly rearwardly of the ground engaging portion of said wheel so that, with advance of the implement, the plow firstly creates sufficient suction to cause the spiked wheel to closely follow ground contour and impale the beets in the row, and thereafter the plow loosens the ground about the impaled beets to facilitate lifting thereof by the spiked wheel with continued forward movement of the latter.

2. A beet lifting implement including a trailing frame vertically swingable about an axis adjacent its forward end and adapted for movement along the ground, a spiked ground engaging wheel journaled on the frame, means cooperating with said spiked wheel to remove beets from the spikes above the ground and to discharge said beets from the implement, and a sub-soil plow mounted in rigid connection with said frame and positioned below the spiked wheel at a predetermined point vertically below and slightly rearwardly of the ground engaging portion of said wheel so that, with advance of the implement, the plow firstly creates sufficient suction to cause the spiked wheel to closely follow ground contour independently of the main frame and impale the beets in the row, and thereafter the plow loosens the ground about the impaled beets to facilitate lifting thereof by the spiked wheel with continued forward movement of the latter; said plow being mounted in connection with the frame by means of a depending standard disposed rearwardly of and transversely centered relative to the wheel.

3. A beet lifting implement including a trailing frame vertically swingable about an axis adjacent its forward end and adapted for movement along the ground, a spiked ground engaging wheel journaled on the frame, means cooperating with said spiked wheel to remove beets from the spikes above the ground and to discharge said beets from the implement, and a sub-soil plow mounted in rigid connection with said frame and positioned below the spiked wheel at a predetermined point vertically below and slightly rearwardly of the ground engaging portion of said wheel so that, with advance of the implement, the plow firstly creates sufficient suction to cause the spiked wheel to closely follow ground contour independently of the main frame and impale the beets in the row, and thereafter the plow loosens the ground about the impaled beets to facilitate lifting thereof by the spiked wheel with continued forward movement of the latter; said plow being mounted in connection with the frame by means of a depending standard disposed rearwardly of and transversely centered relative to the wheel, a portion of the forward edge of said standard above the plow being formed with a forwardly facing cutting blade.

4. A beet lifting implement comprising a wheel supported main frame adapted for movement along a beet row, a longitudinally extending subframe, a pivotal mount connecting said sub-frame adjacent its forward end on the main frame for relative vertical swinging movement and in trailing relation from said pivotal mount when in operative position, a spiked ground engaging wheel journaled in a fixed position on the subframe rearwardly of said pivotal mount, means cooperating with said spiked wheel to remove beets from the spikes above the ground and to discharge said beets from the implement, and a sub-soil plow mounted in rigid connection with said sub-frame, the plow and wheel remaining in the same relative positions upon swinging of the sub-frame and the plow being positioned below the spiked wheel at a predetermined point vertically below and slightly rearwardly of the ground engaging portion of said wheel so that, with advance of the implement, the plow firstly creates sufficient suction to cause the spiked wheel to closely follow ground contour independently of the main frame and impale the beets in the row, and thereafter the plow loosens the ground about the impaled beets to facilitate lifting thereof by the spiked wheel with continued forward movement of the latter.

5. A beet lifting implement comprising a wheel supported main frame adapted for movement along a beet row, a longitudinally extending subframe, a pivotal mount connecting said sub-frame adjacent its forward end on the main frame for relative vertical swinging movement and in trailing relation from said pivotal mount when in operative position, a spiked ground engaging wheel journaled in a fixed position on the sub-frame rearwardly of said pivotal mount, means cooperating with said spiked wheel to remove beets from the spikes above the ground and to discharge said beets from the implement, a sub-soil plow mounted in rigid connection with said sub-frame, the plow and wheel remaining in the same relative positions upon swinging of the sub-frame and the plow being positioned below the spiked wheel at a predetermined point vertically below and slightly rearwardly of the ground engaging portion of said wheel so that, with advance of the implement, the plow firstly creates sufficient suction to cause the spiked wheel to closely follow ground contour independently of the main frame and impale the beets in the row, and thereafter the plow loosens the ground about the impaled beets to facilitate lifting thereof by the spiked wheel with continued forward movement of the latter, and power actuated means operative to raise the sub-frame relative to the main frame whereby to lift the spiked wheel clear of the ground, said power means being normally ineffective to prevent said swinging movement of the frame.

6. A beet lifting implement comprising a wheel supported main frame adapted for moveemnt along a beet row, a longitudinally extending subframe, a pivotal mount connecting said sub-frame adjacent its forward end on the main frame for relative vertical swinging movement and in trailing relation from said pivotal mount, a spiked ground engaging wheel journaled on the sub-frame rearwardly of said pivotal mount, an upstanding guide frame mounted on the main frame adjacent and cooperating with the sub-frame whereby to guide vertical movement of the latter while holding the same against lateral deflection, means cooperating with said spiked wheel to remove beets from the spikes above the ground and to discharge said beets from the implement, and a sub-soil plow mounted in rigid connection with said sub-frame and positioned below the spiked wheel at a predetermined point vertically below and slightly rearwardly of the ground engaging portion of said wheel.

7. A beet lifting implement comprising a wheel supported main frame adapted for movement along a beet row, a longitudinally extending subframe, a pivotal mount connecting said sub-frame adjacent its forward end on the main frame for relative vertical swinging movement and in trailing relation from said pivotal mount, a spiked ground engaging wheel journaled on the sub-frame rearwardly of said pivotal mount, an upstanding guide frame mounted on the main frame adjacent and cooperating with the rear end portion of the sub-frame whereby to guide vertical movement of the latter while holding the same against lateral deflection, means cooperating with said spiked wheel to remove beets from the spikes above the ground and to discharge said beets from the implement, and a sub-soil plow mounted in rigid connection with said sub-frame and positioned below the spiked wheel at a predetermined point vertically below and slightly rearwardly of the ground engaging portion of said wheel; said guide frame including a pair of transversely spaced, arcuate guide beams concentric to the axis of the sub-frame, and guide shoes on the rear end of said sub-frame riding in said guide beams.

8. A beet lifting implement as in claim 6 including normally inactive power means operative to raise the sub-frame relative to the main frame whereby to lift the spiked wheel clear of the ground; said power means including a power winch mounted on the main frame, and a cable extending from said winch upwardly over a sheave on the guide frame, and thence downward to connection with the sub-frame.

9. A beet lifting implement as in claim 6 including a counterbalancing tension spring connected between said guide frame and the sub-frame, the spring opposing the suction of the plow.

10. A beet lifting implement as in claim 1 in which the plow comprises a plow member having a pair of upwardly diverging longitudinally extending blades thereon in transversely spaced relation and a pair of outwardly and rearwardly curved deflector elements mounted rearwardly of said blades; the deflector elements being spaced at least as great a distance as said blades.

11. A beet topping unit for a beet lifting and topping implement which includes a frame adapted for movement along the ground, a ground engaging wheel journaled on said frame, said wheel having a relatively wide face, and a plurality of transversely spaced circumferential rows of rigid beet impaling spikes mounted on the wheel and projecting outwardly therefrom; said beet topping unit being supported by the frame and a plurality of fingers disposed at one end between said rows of spikes, a cutting blade mounted on each finger at said end, and means mounting said fingers for adjustment, as a unit, relative to the face of the wheel, said means including a transverse shaft on which said fingers are fixed, a radial lever fixed on the shaft, and an adjustment assembly associated with said lever normally holding the same fixed but adjustable to vary the radial position thereof.

12. A top stripping unit for a beet lifting and topping implement which includes a frame adapted for movement along the ground, a ground engaging wheel journaled on said frame, said wheel having a relatively wide face, a plurality of transversely spaced circumferential rows of rigid beet impaling spikes mounted on the wheel and projecting outwardly therefrom, and beet topping and top stripping units supported by the frame and disposed in cooperating relation to said spikes above the ground; said top stripping unit cooperating with said spikes beyond the topping unit and comprising a plurality of parallel, longitudinally extending stripping bars projecting between the rows of spikes in a direction opposite to the direction of rotation of the wheel, a transverse supporting shaft on which the stripping bars are separately pivotally secured intermediate their ends, and means yieldably urging said bars into engagement with the face of the wheel.

13. A top stripping unit for a beet lifting and topping implement which includes a frame adapted for movement along the ground, a ground engaging wheel journaled on said frame, said wheel having a relatively wide face, a plurality of transversely spaced circumferential rows of rigid beet impaling spikes mounted on the wheel and projecting outwardly therefrom, and beet topping and top stripping units supported by the frame and disposed in cooperating relation to said spikes above the ground; said top stripping unit cooperating with said spikes beyond the topping unit and comprising a plurality of parallel, longitudinally extending stripping bars projecting between the rows of spikes in a direction opposite to the direction of rotation of the wheel, a transverse supporting shaft on which the stripping bars are separately pivotally secured intermediate their ends, and means yieldably urging said bars into engagement with the face of the wheel; said last named means comprising compression springs engaging said bars beyond said shaft in a direction opposite the wheel.

14. A beet lifting and topping implement comprising a frame adapted to move along the ground, a spiked ground engaging wheel journaled on the frame, a beet topping unit supported on the frame and cooperating with the forward portion of the wheel, a top stripping unit supported on the frame and cooperating with the wheel below said topping unit, a driven transversely extending and discharging conveyor mounted on the frame ahead of the wheel and in top receiving position adjacent the top stripping unit, a driven beet tumbling conveyor open to permit earth to fall therethrough, extending forwardly from the topping unit in overhanging relation to said transverse conveyor whereby earth from the beet tumbling conveyor falls onto said transverse conveyor, a hopper mounted on the frame ahead of said conveyors and into which hopper the beet tumbling conveyor discharges, and a driven, beet carry-off conveyor extending from said hopper laterally at an upward and outward slope to an elevated point of discharge laterally of the implement.

15. A beet lifting and topping implement as in claim 14 in which said hopper includes a plurality of grate-like sides, said sides being initially separate and removably mounted; and the lower portion of the upper run of said beet carry-off conveyor forming the bottom of said hopper.

CLAUDE A. LOUCKS.
LLOYD K. SCHMIDT.